United States Patent [19]

Brown et al.

[11] 4,326,573

[45] Apr. 27, 1982

[54] DEFORMABLE FUEL CELL

[76] Inventors: Mike Brown, 4991 Canyon Rd., Claremore; Jon Brook, 849 Millwood Rd., Broken Arrow, both of Okla.

[21] Appl. No.: 154,950

[22] Filed: May 30, 1980

[51] Int. Cl.³ .............................................. B65D 33/16
[52] U.S. Cl. .................................................... 150/0.5
[58] Field of Search ..................... 220/1 B; 150/0.5, 1

[56] References Cited

U.S. PATENT DOCUMENTS 3,552,599  1/1971  Redding ........................... 150/0.5 X
3,978,901  9/1976  Jones ................................... 150/0.5

*Primary Examiner*—George T. Hall
*Attorney, Agent, or Firm*—Head & Johnson

[57] ABSTRACT

Method of manufacturing a deformable fuel cell embodying the steps of providing a flexible mold which has an opening therein. A nut ring secured to the periphery of the opening and a protective plate is attached to the nut ring. Coating material is applied to the mold which hardens to form a body. The protective plate is removed and the nut ring is detached from the mold. The mold is then collapsed and removed from the body through a hole in the nut ring. Ballistic nylon cloth may be applied to the mold before the application of the coating material.

10 Claims, 8 Drawing Figures

DEFORMABLE FUEL CELL

BACKGROUND OF THE INVENTION

1. Field of the Invention

The present invention relates to a fuel storage device and, more particularly, to such a novel fuel cell which is seamless, lightweight, and deformable.

2. Description of the Prior Art

With the ever increasing popularity of air, boat, and vehicle racing there has been a need for safer fuel storage devices which have increased resistance to puncturing and leakage.

Various fuel cells have been developed in the past to increase the safety of storing fuel. To reduce the likelihood of explosion a non-rigid fuel bladder has been used within racing vehicles. However, due to the extreme forces exerted on a race vehicle these non-rigid bladders cannot be used due to the sloshing of the fuel within the bladder which causes a shifting in the balance of the racing vehicle. Fuel cells have been developed which are generally box-like in shape and fit within the frame of a racing vehicle and are constructed of various forms of epoxy resin. These fuel cells are puncture resistant but have a tendency to break or crack within a collision thereby spilling their fuel contents. Further, these epoxied fuel cells are relatively heavy which deteriorates the competitive performance of the racing vehicle. In manufacturing these prior art fuel cells various manufacturing methods require a second opening to be made within the structure of the fuel cell and later covered over and sealed. This form of prior art fuel cell when exposed to such forces as in a collision will most generally crack or fail at the point of this sealed second opening.

Further, prior art fuel cells have used nylon cloth within the structure of the fuel cell. This nylon cloth has been mainly used as a basis for which the epoxy to be applied to and adds further puncture resistance to the fuel cell. The nylon cloth is cut and tailored to fit in exact dimension of a fuel cell and then is sown together. As can be seen this is a time consuming process. In certain applications the addition of the nylon cloth is not needed within a fuel cell but these prior art fuel cells require the nylon cloth.

There has been a need for a truly seamless, puncture resistant, non-rigid fuel cell which is lightweight, easy to manufacture and can be used with or without nylon cloth.

SUMMARY OF THE INVENTION

The present invention generally provides a fuel storage device which is seamless, lightweight and deformable. Further, an object of the present invention is to provide a fuel cell which may be made with or without nylon cloth. The present invention provides a fuel cell which may be quickly and easily repaired in the event of a puncture. The fuel storage device of the present invention is manufactured by providing a flexible mold which has an opening therethrough. A ring means, such as a plate with a plurality of holes therethrough for engagement with fuel intake and fuel feed device, is secured to the periphery of the opening of the mold. A protective covering is placed over the ring and a coating of material is applied to the mold. This coating material may be of any desired type but in the preferred embodiment of the present invention the coating material is a poly-urethane coating. The coating is then allowed to harden which forms a body. Thereafter the protective device is removed from the ring and the ring is detached from the mold. The mold is then collapsed and moved from the interior of the body. To aid in the applying of the covering material a covering plate may be secured to the ring before the application and the covering plate is attached to a rotating rod whereby the mold is rotated while the coating material is applied, such as by spraying. In the event that a more puncture resistant body is desired, the molds may be wrapped, enveloped, or encapsulated within fabric material, such as nylon cloth. Any resulting seams from the wrapping of the fabric material around the mold is then fused, such as by applying a heating iron, and the coating material is applied around the mold. Mold release material is applied to the mold before the application of the coating material to aid in the removal thereof.

DETAILED DESCRIPTION OF THE PREFERRED EMBODIMENTS

Figure 1:
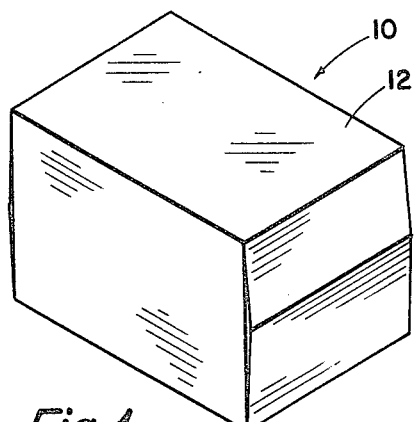
FIGS. 1-6 are perspective views of a sequence of steps in the manufacturing of the present invention.
Figure 2:
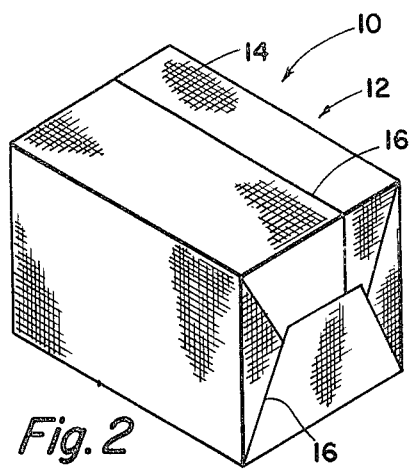
Figure 3:
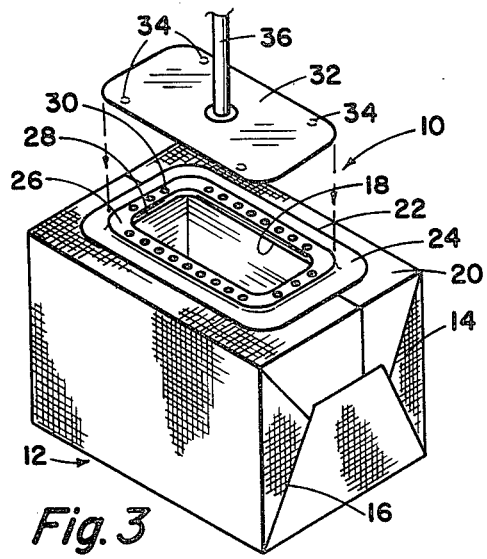

Referring to the drawings in detail, reference character 10 generally indicates a fluid container for fuel and commonly referred to as a fuel cell which is of a seamless construction. The fuel cell 10 is light-weight and deformable and has additional benefits of being easy to manufacture and highly puncture resistant. The present invention can best be understood by understanding the method of manufacture thereof. As shown in FIG. 1, a collapsible mold 12 is provided and is the starting point from which the fuel cell 10 is formed. The mold 12 may be of any shape or configuration desired and may be constructed from any suitable material. Preferably, for ease of manufacture and for low cost, the mold 12 is a thin walled cardboard box. The mold 12 is wrapped with nylon cloth 14 and the resulting seams 16 are fused together by application of heat, such as by a heating iron, to provide a seamless enclosure. The nylon cloth 14 used in construction of the present invention is most preferably of a tear resistant quality such as ballistic nylon cloth.

After the mold 12 has been wrapped with the nylon cloth 14 an opening 18 is cut into a panel 20 of the fuel cell 10. A nut ring 22 is then secured to the panel 20 by any suitable means around the periphery of the opening 18. The nut ring 22 has a base portion 24 and an upset rim 26 around an opening 28 therein. The rim 26 is provided with a plurality of spaced holes 30 whose function will be described in more detail hereinbelow. One means of attaching the nut ring 22 to the panel 20 is by placing a plurality of nuts or pins (not shown) through the holes 30 and through the cloth 14 and the mold 12.

Figure 4:
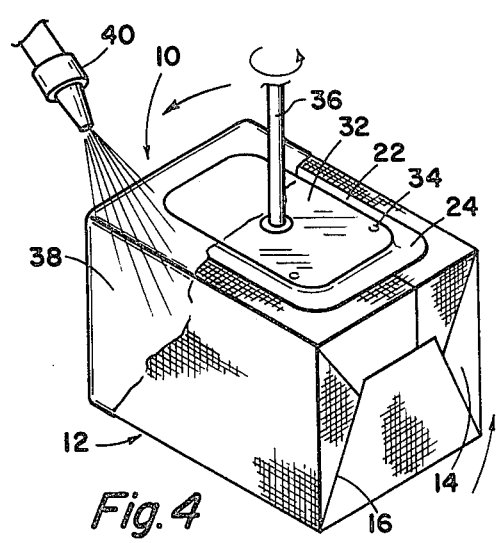
Figure 5:
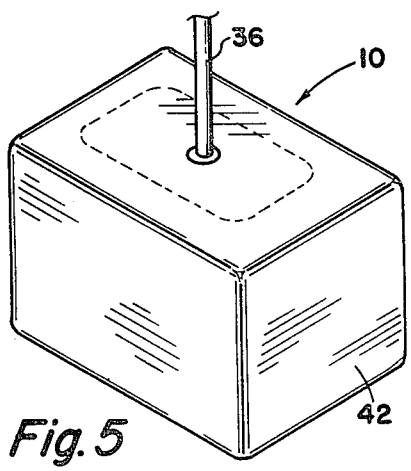
Figure 6:
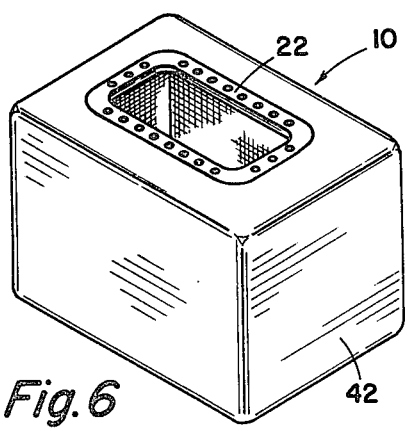

A covering plate 32 is then fastened to the nut ring 22 by means of a plurality of bolts 34 spaced therearound and which are threaded into the holes 30. A shaft 36 is secured to the covering plate 32 and which is in turn connected to rotation means (not shown). When the covering plate 32 has been secured to the nut ring 22 mold release material, such as a poly-olefin sheet, or a silicone or wax compound, is applied to the covering plate 32 and part of the shaft 36. The rotation means is activated and as the fuel cell 10 is rotated upon the shaft 36 coating material is applied thereto. The coating material 38 may be brushed on, placed in a vat (not shown) and with the fuel cell 10 being placed therein, or most preferably is sprayed on through a spraying means 40, as shown in FIG. 4. The coating material 38 may be any relatively inert material which will form a flexible resistant coating. It has been found that the most preferable material is a polyether urethane elastomer, such as a product of Uniroyal Corporation under the trade name "VIBRA SPRAY-80".

The coating material 38 is allowed to cure or harden to form a body 42. The covering plate 32 is cut loose from a hardened coating material 38 and is removed from the nut ring 22. The coating material 38 is easily removed from the covering plate 32 due to the application of the mold release. The mold 12 is then released from the nut ring 22 and is collapsed and removed through the opening 28 in the nut ring 22. The completed fuel cell 10 is then cleaned and inspected.

Figure 7:
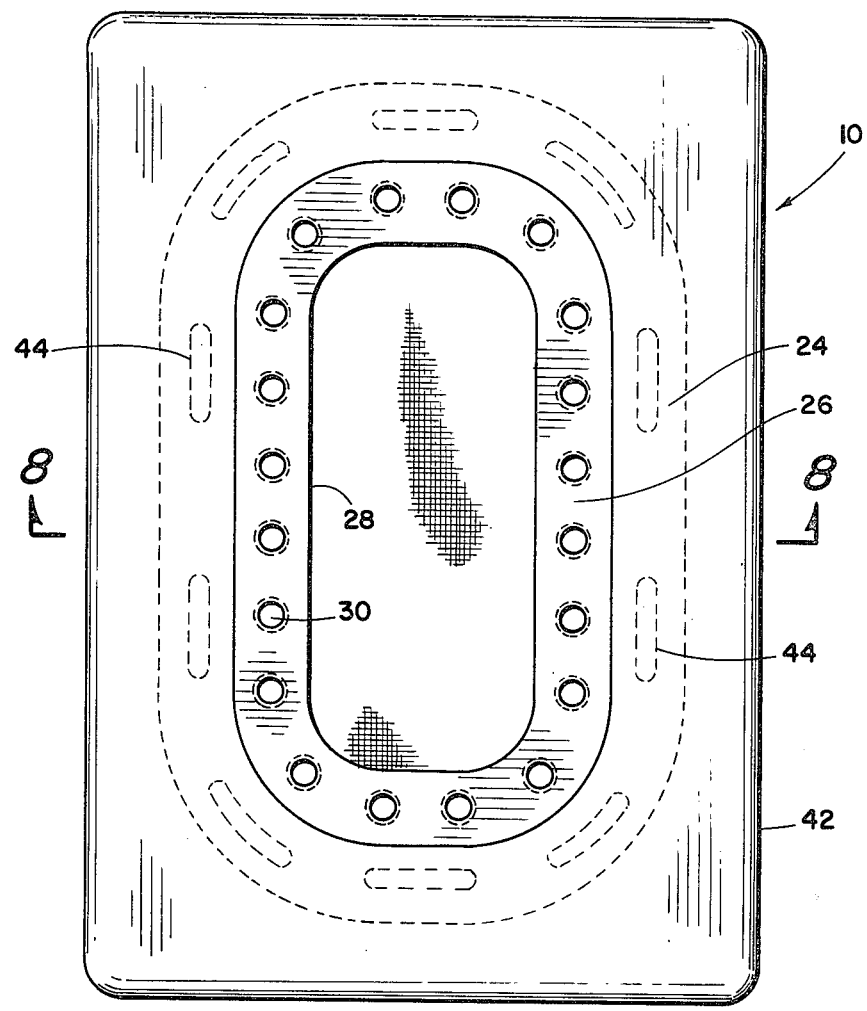
FIG. 7 is a top plan view of the present invention.
Figure 8:
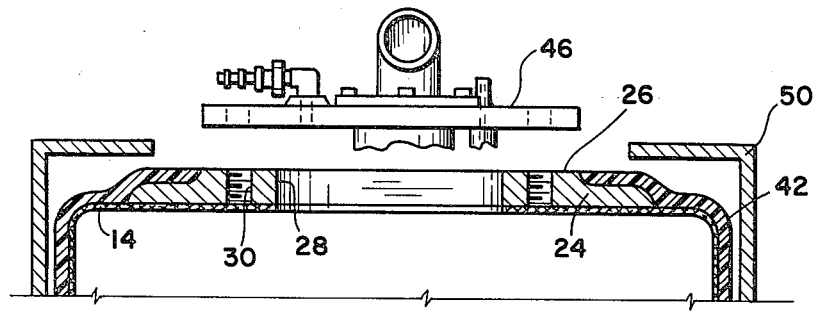
FIG. 8 is a view taken along line 8—8 of FIG. 7.

As can be seen, this method of manufacturing provides a seamless, lightweight, puncture resistant fuel cell 10 or container which can be manufactured within any desired shape and has the further advantage of having the nut ring 22 bonded to the body 42 thereby insuring that no contained liquids can escape through the juncture of the nut ring 22 and the body 42. As shown in FIG. 7, the nut ring 22 may be provided with a plurality of spaced elongated openings 44 in the base portion 24. The opening 44 allows the coating material 38 to flow therethrough and into direct contact with the nylon cloth 14 to form a tight bond between the nut ring 22 and the body 42.

A fuel communication means 46 is bolted to the nut ring 22 and is of the rapid fill type as used in racing vehicles. To securely hold the fuel cell 10 within the vehicle (not shown) a metal container 50, constructed of aluminum or steel, is provided and is of a dimension slightly larger than the fuel cell 10. The fuel cell 10 is placed within the container 50 and provides additional protection for the fuel cell 10 from heat or possible puncturing articles resulting from a collision. Blocks of foam (not shown) may be placed within the fuel cell 10 to aid in preventing the movement of the fuel.

In the event that the added puncture resistance provided by the ballistic nylon cloth 14 or other similar liner material is not required then an alternate embodiment of the present invention may be constructed by totally coating the mold 12 with mold release such as a wax or silicone compound or a poly-olefin film or comparable type of tape product and then performing the same steps as described above only with the elimination of the nylon cloth 14. This alternate method produces a fuel cell which has the same characteristics of the fuel cell 10 but with slightly less puncture resistance.

In prior art fuel cells when extreme forces were applied to the vehicle such as in a collision then these fuel cells will tend to fail and leak fluid from around the fuel communication means or will burst at any non-fused seams. Also, if the prior art fuel cell is of a hardened construction then these fuel cells tend to crack in a collision. The present invention provides a lightweight fuel cell which is deformable to aid in resisting the forces of a collision or a penetrating article and also provides a seamless and bonded configuration which greatly minimizes any chance of leakage of fuel during a collision. Further, in the event that there is a puncture to body 42 then this puncture is very easily repaired by the application of a solvent and layering of additional coating material 38 and nylon cloth 14.

Whereas the present invention has been described in particular relation to the drawings attached hereto, it should be understood that other and further modifications of the invention, apart from those shown or suggested herein, may be made within the scope and spirit of this invention.

What is claimed is:

1. A fluid storage device comprising a unitary end seamless deformable body having an opening therethrough, and ring means bonded to the periphery of said opening.

2. A fluid storage device as in claim 1 wherein said ring means is bonded to said body.

3. A fluid storage device as in claim 1 wherein said ring means is a gasket for engagement with fluid communication means.

4. A fluid storage device as in claim 1 wherein said fluid is a combustible liquid.

5. A fluid storage device as in claim 1 wherein said body is disposed within an enclosure of a dimension slightly larger than said body.

6. A fluid storage device as in claim 1 wherein said body is constructed of a poly-urethane elastomer.

7. A fluid storage device as in claim 1 wherein said body is bonded to a fabric liner.

8. A fluid storage device as in claim 7 wherein said fabric liner is ballistic nylon cloth.

9. A fluid storage device as in claim 7 wherein said fabric liner has seams which are fused together before said body is bonded thereto.

10. A fluid storage device comprising a deformable body having an opening therethrough, ring means bonded to the periphery of said opening, said body being bonded to a fabric liner, and wherein said ring means has a plurality of spaced slots around the outer periphery thereof wherein a portion of said body extends through each and is bonded to said fabric liner.

* * * * *